United States Patent [19]

Harder

[11] Patent Number: 4,533,010

[45] Date of Patent: Aug. 6, 1985

[54] TRUCK HAVING A FRONT AXLE OSCILLATABLE RELATIVE TO A REAR AXLE

[76] Inventor: David Harder, 1100 Marron Cir., NE., Albuquerque, N. Mex. 87112

[21] Appl. No.: 436,276

[22] Filed: Dec. 30, 1982

[51] Int. Cl.³ .............................................. B62D 53/02
[52] U.S. Cl. ...................................... 180/41; 280/111
[58] Field of Search ...................... 280/111, 62; 180/41

[56] References Cited

U.S. PATENT DOCUMENTS 3,189,117  6/1965  Ammon ................................ 280/111
4,079,955  3/1978  Thorpe et al. ....................... 280/111

Primary Examiner—John A. Pekar

[57] ABSTRACT

This invention discloses a front axle for a ground engaging vehicle. The front axle is oscillatable relative to a rear axle for enabling all the wheels to contact the ground under adverse terrain conditions. Primarily, the vehicle comprises a main frame having the rear axle attached; and, a sub-frame which is pivotally attached to the main frame and contains the front axle. The vehicle further includes a torque tube on the rear drive shaft having a hydraulic cylinder controlled torque tube for controlling the action of the sub-frame relative to the main frame.

8 Claims, 5 Drawing Figures

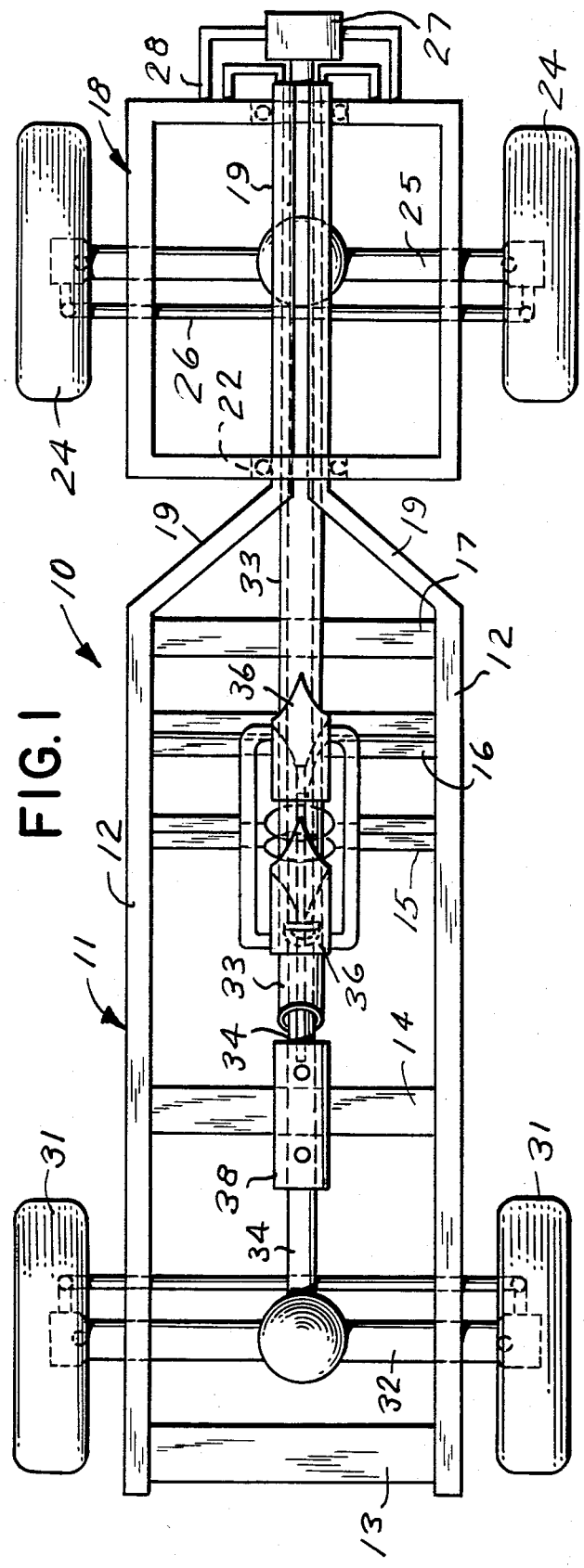

TRUCK HAVING A FRONT AXLE OSCILLATABLE RELATIVE TO A REAR AXLE

This invention relates to ground supported vehicles, and more particularly to a truck to be used both on the roadways, and more specifically in rugged terrain. Presently known prior art vehicles of this type generally have limited utility in that they are not entirely saftisfactory for use on roadways due to lack of suitable suspension, adequate stability, and speed.

Presently known vehicles of this type usually employ a joint located between the axles to provide oscillation between different parts of the vehicle. This construction is usually associated with large, weighty, and expensive mechanisms.

The object of this invention is therefore to provide a vehicle of the above type having greater utility, simplified and durable construction, and which is relatively inexpensive to manufacture.

Another object of this invention is to provide a vehicle with a unique arrangement of component parts which achieves greater structural strength and durability.

Another object of this invention is to provide a truck of about forty thousand pound gross vehicle weight which employs two driven and steerable axles.

Still another object of this invention is to provide a truck having a front axle arranged in a manner to provide approximately three hundred and thirty degrees of oscillation relative to the rear axle, thus permitting full wheel contact for all supporting wheels under adverse terrain conditions, and wherein a locking mechanism is provided so that oscillation can be prevented or, alternatively, limited to less than the maximum degree possible.

Another object of this invention is to provide a truck with an improved locking mechanism which imparts sufficient mechanical advantage into the structure so that it is possible to alter individual wheel loadings to a limited degree, thereby achieving improved traction under adverse conditions; and wherein the wheel loading can be altered only when the front and rear axles are not located in the same plane.

A further object of this invention is to provide a truck type vehicle in which a loading mechanism alters wheel loadings, and provides a means of preventing oscillation when stability is desired, and further permits oscillation in rough terrain, thereby minimizing torsional stresses on the frame and driveline components.

These and other objects will be readily evident after having studied the following specification and the accompanying drawing, wherein:

FIG. 1 is a top plan view of a vehicle made in accordance with the present invention;

FIG. 2 is an enlarged, fragmentary, side view of a locking mechanism of the invention, shown in elevation;

FIG. 3 is a fragmentary, part cross-sectional, end view of the sub-frame of the vehicle seen in FIG. 1, shown with some parts broken away, and in elevation; and, FIG. 4 is a fragmentary, side elevational view of part of the invention disclosed in FIG. 1.

Figure 5:
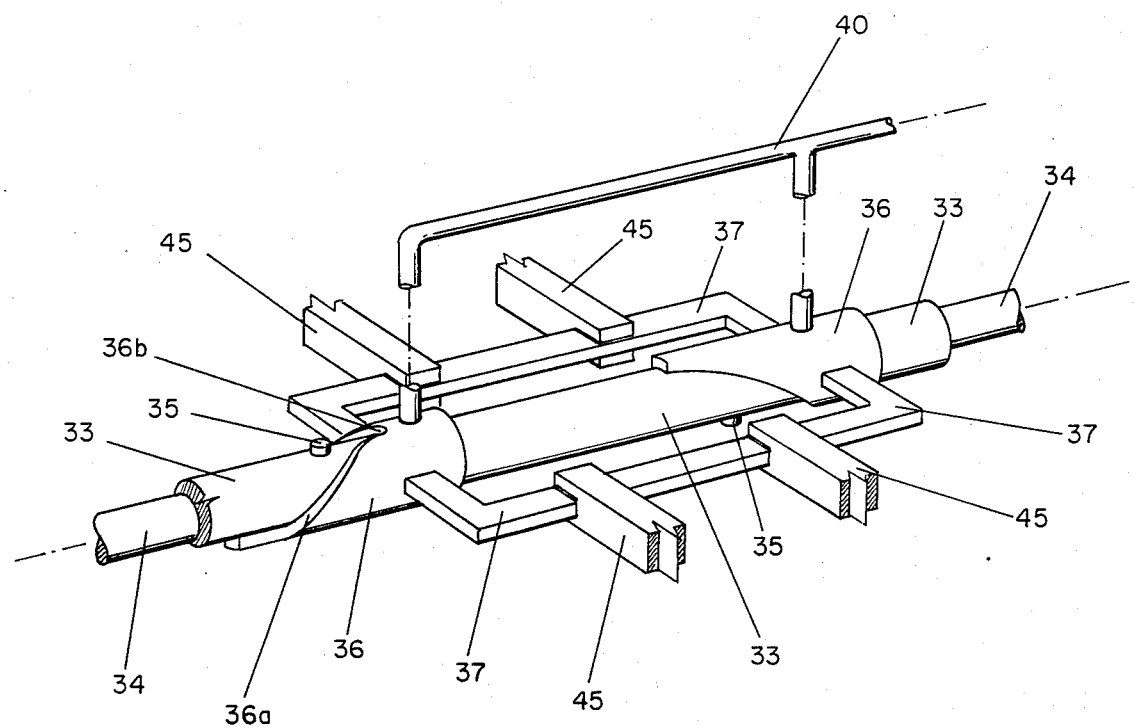
FIG. 5 is a fragmentary perspective view of the locking mechanism.

According to the invention, and as seen in FIG. 1, a ground supported vehicle 10, such as a truck, for example, includes a main frame 11 which comprises a pair of opposed side members 12 connected to a plurality of cross-beam members 13, 14, 15, 16, and 17, all of which are welded or otherwise secured between the confronting faces of side members 12. A rectangular sub-frame 18 is mounted forwardly of main frame 11, on the illustrated two angularly disposed front frame rails 19, which are held in yoke members 20, (FIG. 2) by the semi-circular bottom portion 21 of sub-frame 18, and the semi-circular cap member 22. Cap member 22 is secured to sub-frame 18, by means of suitable bolt fasteners 23, and thereby provides means by which sub-frame 18 is pivotal right and left, laterally on the longitudinal axis of main frame 11, so as to enable the front wheels to navigate rough terrain easily. Wheels 24 are mounted to the front axle 25, in a manner common in the art, and not specifically shown, as is the axle 25, which is steerable by rod 26. Transfer case 27 is mounted to sub-frame 18 by mounts 28, and the transmission 29 (FIG. 4) is coupled to the engine 30, of which its shaft 29a couples case 27, the engine 30 being mounted in a suitable manner, not shown. The rear wheels 31 are mounted to rear axle 32, which is secured to the rear of main frame 11, in a manner common in the art, and it shall be noted that the cab, steering gear, radiator, linkages, fuel tanks, etc., are not shown, for the sake of clarity.

A torque tube 33 is freely received on drive shaft 34, and a pair of oppositely opposed projections 35 are fixedly secured to the outer periphery of torque tube 33 in a suitable manner, and are removably received in cut out slots 36b shown in FIG. 5, in a pair of sleeves 36, which are locking mechanisms. A projecting flange 37 is fixedly secured to the opposed outer peripheral surface of both sleeves 36. The flanges 37 are slideably received in guides, 45, affixed to frame 12, so as to prevent them from rotating; however, sleeves 36 are movable forward and backward, by a hydraulic cylinder 38, which is suitably secured to cross-beam 14 of the main frame 11. The piston rod 39 of hydraulic cylinder 38 is suitably secured to flanges 37 at one end, and the ends of flanges 37 are fixedly secured to the outer peripheries of the sleeves 36. The drive shaft housing 34 to the rear is secured to the axle 32, while the torque tube 33 extends into the frame rails 19, and is fixedly secured to the front sub-frame 18 in a suitable manner. The front drive shaft 41 extends from the transfer case 27, and is coupled to the front axle 25, in a known manner.

In operation, oscillation is provided by bringing the frame rails 19 together near the front of vehicle 10, and attaching the rails 19 to the circular sections 21, 22 upon which the front subframe 18, thereby enabling rotation of the sub-frame relative to the main frame. Forward and rearward motion of the sub-frame respective to the main frame is prevented by flanges which are captured by the forward and rear ends of the circular sections.

This method of providing oscillation differs from that used on previously known vehicles of this type in that the present means for providing oscillation is located over the axle rather than between the axles as is the existing practice.

The means of providing oscillation described in the invention is structurally superior to existing methods in that tension is maintained along the bottom of the frame rails in order that they might bear a portion of the loads to which the frame is subjected in vehicle usage. In existing vehicles of the general type described, a joint comprised of two or more hollow cylindrical sections, one revolving about the other, is utilized at some point between the front and rear axles of the vehicle. Said joint is part of the vehicle frame and is therefore subjected to loads as the vehicle is used. The inner cylindrical section of said joint is compressed on its upper surface at the point where the outer cylindrical section ends. Likewise, the inner cylindrical section is compressed at its opposite end on the lower surface. The compression of the inner cylinder against the outer cylinder has relieved the tension along the bottom of the outer cylinder for the length that the inner cylinder is inside the outer cylinder. Thus the bottom portion of the outer cylinder does not bear any portion of the loads to which the frame is subjected.

Consequently in order for this prior art type of joint to provide suitable oscillation requires components that are large, heavy and carefully machined if it is to be acceptable. The means of oscillation described in this invention dispenses with the need for these expensive and heavy components.

The invention described herein can be constructed using a minimal amount of the illustrated unique components and very little specialized machine work. The engine, transmission, transfer case, axles, cab, electrical and hydraulic systems can be fabricated using commercially available components.

The engine 30 and transmission 29 are preferably mounted backwards, with the transmission 29 located in front, which drives the in-put of the transfer case 27. The transfer case 27 includes two outputs, the lower output shaft 41 drives the front axle 25, and the upper output, or middle shaft, drives the rear axle 34. Since the transfer case 27 is mounted on the front sub-frame 18, any oscillation between case 27 and the main frame 11 will be a small fraction of the rotation of the drive shaft 34 to the rear. When the locking mechanism, which includes the pair of sleeves 36, is retracted by the hydraulic cylinder 38, the torque tube 33 and sub-frame 18 are allowed to oscillate relative to the rear of truck 10, and the end of the sleeve 36 combination cannot be withdrawn past the projections 35 on the torque tube 33, thus, three hundred and sixty degree oscillation is not possible. At any time when no oscillation between front sub-frame 18 and main frame 11 is desirable, or when it is desirable that the maximum amount of oscillation is to be restricted, the locking mechanism may be extended, either partially or fully, and the arcuate edges 36a are given a mechanical advantage in rotating the torque tube 33.

It shall be recognized, that the rear axle steering will be of the self-centering type, and will not be operable at high speeds, and the suspension will be a conventional semi-elliptic leaf spring. The fuel tanks will be located in the sub-frame, above the front axle, and the cab preferably are provided with fins, for ducting air into the radiator behind the cab.

While various changes may be made in the detail construction, it is understood that such changes will be within the spirit and scope of the present invention, as is defined by the appended claims.

What I now claim is:

1. In a vehicle having a main frame, at least one axle attached to said main frame, a sub-frame attached to said main frame, at least one axle secured to said sub-frame, a transfer case secured to said sub-frame, an engine secured to said sub-frame or main frame, a transmission secured to said sub-frame or main frame, a drive shaft for said axle attached to said main frame, a torque tube secured to said main frame and said sub-frame, and a locking mechanism secured to said main frame; the improvement comprising:

said main frame and said sub-frame are substantially rectangular in configuration; means by which said sub-frame is pivotal respective to said main frame;

means by which said torque tube is received on said drive shaft for said axle attached to said main frame, and is received in one end of said sub-frame for controlling the oscillation of said sub-frame and said axle relative to said main frame and said attached axle; and, a pair of spaced sleeves slidable on said torque tube; a hydraulic cylinder secured to said main frame and to said sleeves whereby said sleeves and said hydraulic cylinder comprise a locking mechanism which controls the oscillation of said sub-frame.

2. The improvement of claim 1 wherein said sleeves are connected together by a rod, and said hydraulic cylinder has a piston which is connected to one of said sleeves so that said sleeves are reciprocated respective to said torque tube when said piston moves respective to the cylinder thereof.

3. The improvement of claim 1 wherein a projection is affixed to said torque tube and extends through a wall of said sleeve; a flange is secured to the sleeves and are slidably captured to prevent rotation of said sleeves.

4. The improvement of claim 1 wherein said sleeves are connected together by a rod, and said hydraulic cylinder has a piston which is connected to one of said sleeves so that said sleeves are reciprocated respective to said torque tube when said piston moves respective to the cylinder thereof;

wherein a projection is affixed to said torque tube and extends through a wall of said sleeve; a flange is secured to the sleeves and are slidably captured to prevent rotation of said sleeves.

5. A vehicle which has a main frame supported on at least one axle, a sub-frame secured to said main frame and supported on at least one axle, a transfer case, an engine and transmission, a rear drive shaft housing; the combination with said vehicle of a torque tube, and a locking mechanism therefor;

means by which said sub-frame is pivotally mounted respective to said main frame;

means by which said torque tube is attached to said drive shaft housing of said axle supporting said main frame, and is received in one end of said sub-frame for controlling the oscillation of said sub-frame and said supporting axle relative to said main frame and said supporting axle; means by which a pair of spaced sleeves are axially aligned and slidably mounted on said torque tube; a hydraulic cylinder secured to said main frame and to said sleeves whereby said sleeves and said hydraulic cylinder comprise a locking mechanism which controls the oscillation of said sub-frame.

6. The improvement of claim 5 wherein said sleeves are connected together by a rod, and said hydraulic cylinder has a piston which is connected to one of said sleeves so that said sleeves are reciprocated respective to said torque tube when said piston moves respective to the cylinder thereof.

7. The improvement of claim 6 wherein a projection is affixed to said torque tube and extends through a wall of said sleeve; a flange is secured to the sleeves and are slidably captured to prevent rotation of said sleeves.

8. The improvement of claim 5 wherein said sleeves are connected together by a rod, and said hydraulic cylinder has a piston which is connected to one of said sleeves so that said sleeves are reciprocated respective to said torque tube when said piston moves respective to the cylinder thereof;

wherein a projection is affixed to said torque tube and extends through a wall of said sleeve; a flange is secured to the sleeves and are slidably captured to prevent rotation of said sleeves.

* * * * *